US012412688B2

(12) United States Patent
Iso et al.

(10) Patent No.: US 12,412,688 B2
(45) Date of Patent: Sep. 9, 2025

(54) ELECTRONIC COMPONENT AND MANUFACTURING METHOD FOR THE SAME

(71) Applicant: Murata Manufacturing Co., Ltd., Kyoto-fu (JP)

(72) Inventors: Eiji Iso, Nagaokakyo (JP); Isao Ida, Nagaokakyo (JP); Hiroshi Okuizumi, Nagaokakyo (JP); Takao Kawachi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 479 days.

(21) Appl. No.: 17/935,412

(22) Filed: Sep. 26, 2022

(65) Prior Publication Data

US 2023/0015749 A1 Jan. 19, 2023

Related U.S. Application Data

(62) Division of application No. 16/151,121, filed on Oct. 3, 2018, now Pat. No. 11,488,753.

(30) Foreign Application Priority Data

Oct. 12, 2017 (JP) ................................ 2017-198304

(51) Int. Cl.
*H01F 1/14* (2006.01)
*H01F 17/00* (2006.01)
(Continued)

(52) U.S. Cl.
CPC ........... *H01F 1/14* (2013.01); *H01F 17/0013* (2013.01); *H01F 17/0033* (2013.01);
(Continued)

(58) Field of Classification Search
CPC .... H01F 1/14; H01F 17/0013; H01F 17/0033; H01F 17/04; H01F 27/255;
(Continued)

(56) References Cited

U.S. PATENT DOCUMENTS

2010/0259353 A1 10/2010 Saito et al.
2013/0033348 A1 2/2013 Saito et al.

FOREIGN PATENT DOCUMENTS

CN 101859641 A 10/2010
JP S59-065523 U1 5/1984
(Continued)

OTHER PUBLICATIONS

An Office Action; “Notification of Reasons for Refusal,” mailed by the Japanese Patent Office on Apr. 28, 2020, which corresponds to Japanese Patent Application No. 2017-198304 and is related to U.S. Appl. No. 16/151,121 with English language translation.
(Continued)

*Primary Examiner* — Ricardo D Morales
(74) *Attorney, Agent, or Firm* — Studebaker Brackett PLLC

(57) ABSTRACT

A manufacturing method for an electronic component includes preparing a first composite magnetic section provided with a first composite magnetic layer and at least one marker layer disposed on the first composite magnetic layer; and preparing a second composite magnetic section provided with a second composite magnetic layer and at least one coil formed by winding a conductive wire and buried in the second composite magnetic layer with part of the coil being exposed. The manufacturing method further includes obtaining a multilayer body by disposing the first composite magnetic section so that a surface on the opposite side of the first composite magnetic section to a surface where the marker layer is disposed opposes a surface of the second
(Continued)

composite magnetic section; and obtaining a molded body having a marker area formed with non-conductive particles pressed into the first composite magnetic layer.

6 Claims, 5 Drawing Sheets

(51) Int. Cl.

| | |
|---|---|
| ***H01F 17/04*** | (2006.01) |
| ***H01F 27/255*** | (2006.01) |
| ***H01F 27/28*** | (2006.01) |
| ***H01F 27/29*** | (2006.01) |
| ***H01F 41/02*** | (2006.01) |
| ***H01F 41/04*** | (2006.01) |

(52) U.S. Cl.
CPC ........... *H01F 17/04* (2013.01); *H01F 27/255* (2013.01); *H01F 27/2804* (2013.01); *H01F 27/2852* (2013.01); *H01F 27/292* (2013.01); *H01F 41/0246* (2013.01); *H01F 41/041* (2013.01); *H01F 2017/0073* (2013.01); *H01F 2017/048* (2013.01); *H01F 2027/2809* (2013.01)

(58) Field of Classification Search
CPC ............. H01F 27/2804; H01F 27/2852; H01F 27/292; H01F 41/0246; H01F 41/041; H01F 2017/0073; H01F 2017/048; H01F 2027/2809
See application file for complete search history.

(56) References Cited

FOREIGN PATENT DOCUMENTS

| | | | | | |
|---|---|---|---|---|---|
| JP | S64-022016 A | | 1/1989 | | |
| JP | S6422016 A | * | 1/1989 | ............... | H01G 2/24 |
| JP | S64-022016 U | | 2/1989 | | |
| JP | 2007-027351 A | | 2/2007 | | |
| JP | 2007-214509 A | | 8/2007 | | |
| JP | 2007-242806 A | | 9/2007 | | |
| JP | 2010-245473 A | | 10/2010 | | |
| JP | 2011003761 A | * | 1/2011 | | |

OTHER PUBLICATIONS

An Office Action; "Notification of Reasons for Refusal," Mailed by the Japanese Patent Office on Dec. 10, 2019, which corresponds to Japanese Patent Application No. 2017-198304 and is related to U.S. Appl. No. 16/151,121; with English language translation.

An Office Action issued by the China National Intellectual Property Administration on Sep. 25, 2020, which corresponds to Chinese Patent Application No. 201811172015.0 and is related to U.S. Appl. No. 16/151,121 with English language translation.

* cited by examiner

ELECTRONIC COMPONENT AND MANUFACTURING METHOD FOR THE SAME

CROSS-REFERENCE TO RELATED APPLICATION

This application is a Divisional of U.S. patent application Ser. No. 16/151,121, filed on Oct. 3, 2018, which claims benefit of priority to Japanese Patent Application No. 2017-198304, filed Oct. 12, 2017, the entire content of which is incorporated herein by reference.

BACKGROUND

Technical Field

The present disclosure relates to an electronic component and a manufacturing method for the same.

Background Art

Of electronic components, there are such electronic components that need to be mounted in a manner in which the front and rear, the direction, and the like thereof must be taken into consideration and adjusted when mounted on a circuit board or the like. As such, electronic components having some markers on their surfaces are well-known as an electronic component whose front and rear, direction, and the like can be identified. However, in a case where a marker is to be attached after the completion of the electronic component, it is necessary to attach the marker after having identified the front and rear, the direction, and the like. This is complicated work. To solve such a problem, methods for attaching a marker during the formation of the electronic component are proposed.

In an electronic component described in Japanese Unexamined Utility Model Registration Application Publication No. 59-65523, since a marker is engraved by punching, a difference in color or a difference in contrast between the marker portion and other portions is small, and therefore it is difficult in some case to recognize the marker with a camera of an automatic appearance inspection machine or the like, for example. In addition, in electronic components described in Japanese Unexamined Patent Application Publication No. 2007-27351 and Japanese Unexamined Patent Application Publication No. 2007-242806, since the marker itself has a thickness, it is necessary to consider the thickness of the marker in designing the outer shape dimension of the electronic component.

SUMMARY

The present disclosure provides an electronic component including a marker that is excellent in identifiability and has substantially no thickness, and a manufacturing method for the stated electronic component.

A first aspect of the present disclosure is a manufacturing method for an electronic component. The method includes preparing a first composite magnetic section provided with a first composite magnetic layer containing magnetic particles and resin, and at least one marker layer disposed on the first composite magnetic layer and containing non-conductive particles; and preparing a second composite magnetic section provided with a second composite magnetic layer containing magnetic particles and resin, and at least one coil which is formed by winding a conductive wire and is buried in the second composite magnetic layer with part of the coil being exposed. The method further includes obtaining a multilayer body by disposing the first composite magnetic section in such a manner that a surface on the opposite side of the first composite magnetic section to a surface where the above-mentioned marker layer is disposed opposes a surface of the second composite magnetic section where the above-mentioned part of the coil is exposed; and obtaining a molded body having a marker area formed with the non-conductive particles in the marker layer being pressed into the first composite magnetic layer by compression molding of the multilayer body.

A second aspect of the present disclosure is a manufacturing method for an electronic component. The method includes preparing a first composite magnetic section provided with a first composite magnetic layer containing magnetic particles and resin; and preparing a second composite magnetic section provided with a second composite magnetic layer containing magnetic particles and resin, and at least one coil which is formed by winding a conductive wire and is buried in the second composite magnetic layer with part of the coil being exposed. The method further includes disposing at least one marker layer containing non-conductive particles on a surface on the opposite side of the second composite magnetic section to a surface where the above-mentioned part of the coil is exposed; obtaining a multilayer body by disposing the first composite magnetic section on the surface of the second composite magnetic section where the above-mentioned part of the coil is exposed; and obtaining a molded body having a marker area formed with the non-conductive particles in the marker layer being pressed into the second composite magnetic layer by compression molding of the multilayer body.

A third aspect of the present disclosure is an electronic component including an element body containing magnetic particles and resin; a coil incorporated in the element body and formed by winding a conductive wire; a marker area disposed on a surface of the element body and containing non-conductive particles; and a pair of outer electrodes disposed on the surface of the element body and connected to the coil. In the stated electronic component, the non-conductive particles have a smaller volume average particle diameter than the magnetic particles, and the non-conductive particles are disposed between the magnetic particles in the marker area.

According to the present disclosure, it is possible to provide an electronic component including a marker having excellent identifiability and having substantially no thickness, and a manufacturing method for the stated electronic component.

Other features, elements, characteristics and advantages of the present disclosure will become more apparent from the following detailed description of preferred embodiments of the present disclosure with reference to the attached drawings.

DETAILED DESCRIPTION

Figure 1A:
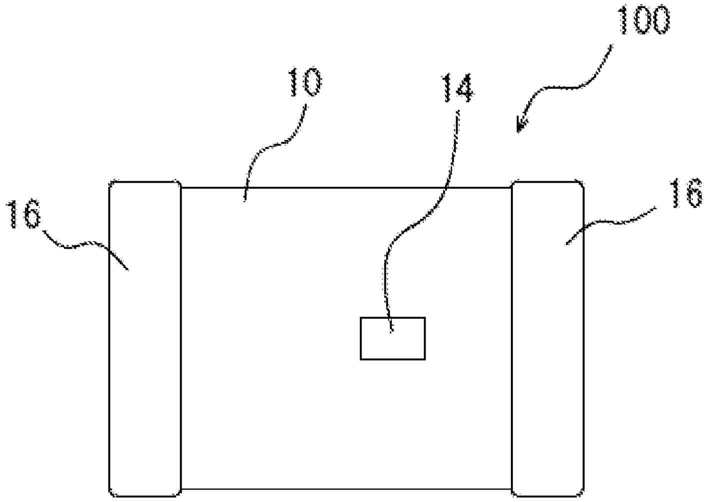
FIG. 1A is a plan view illustrating an external appearance of an electronic component.

A manufacturing method for an electronic component of a first aspect of the present disclosure includes first preparation processing configured to prepare a first composite magnetic section provided with a first composite magnetic layer containing magnetic particles and resin, and at least one marker layer disposed on the first composite magnetic layer and containing non-conductive particles; and second preparation processing configured to prepare a second composite magnetic section provided with a second composite magnetic layer containing magnetic particles and resin, and at least one coil which is formed by winding a conductive wire and is buried in the second composite magnetic layer with part of the coil being exposed. The manufacturing method further includes lamination processing configured to obtain a multilayer body by disposing the first composite magnetic section in such a manner that a surface on the opposite side of the first composite magnetic section to a surface where the above-mentioned marker layer is disposed opposes a surface of the second composite magnetic section where the above-mentioned part of the coil is exposed; and molding processing configured to obtain a molded body having a marker area formed with the non-conductive particles in the marker layer being pressed into the first composite magnetic layer by compression molding of the multilayer body.

A manufacturing method for an electronic component of a second aspect of the present disclosure includes first preparation processing configured to prepare a first composite magnetic section provided with a first composite magnetic layer containing magnetic particles and resin; and second preparation processing configured to prepare a second composite magnetic section provided with a second composite magnetic layer containing magnetic particles and resin, and at least one coil which is formed by winding a conductive wire and is buried in the second composite magnetic layer with part of the coil being exposed. The manufacturing method further includes marker disposition processing configured to dispose at least one marker layer containing non-conductive particles on a surface on the opposite side of the second composite magnetic section to a surface where the above-mentioned part of the coil is exposed; lamination processing configured to obtain a multilayer body by disposing the first composite magnetic section on the surface of the second composite magnetic section where the above-mentioned part of the coil is exposed; and molding processing configured to obtain a molded body having a marker area formed with the non-conductive particles in the marker layer being pressed into the second composite magnetic layer by compression molding of the multilayer body.

In the manufacturing methods for the electronic component, after the formation of a multilayer body where a marker layer containing non-conductive particles is disposed on a surface of the electronic component, compression molding is performed on the multilayer body. As a result, the coil is incorporated in an element body formed of the first and second composite magnetic body layers, and the non-conductive particles contained in the marker layer are pressed into a surface of the element body to form a marker area. In the marker area, the non-conductive particles are buried near the surface of the element body, and the marker area has no substantial thickness. In addition, since the non-conductive particles are disposed near the surface of the element body, the marker area can have good identifiability with respect to the areas other than the marker area. Further, by forming the marker area when the coil is incorporated in the element body, it is possible to uniquely determine the positional relationship between a winding axis direction of the coil and the marker area.

In the manufacturing methods, the molded body may incorporate a plurality of coils, and in this case, the manufacturing methods may further include dividing processing configured to divide the molded body incorporating the plurality of coils to obtain divided bodies each including a coil and a marker area.

Since the plurality of coils incorporated in the molded body is disposed having a predetermined winding axis direction, when the molded body is divided, the positional relationship between the winding axis direction of the coil and the marker area in each individual divided body can be made the same. This makes it possible to efficiently manufacture the electronic components.

The manufacturing methods may further include processing of forming an outer electrode to be connected to the coil. By providing the outer electrode, mounting operation on a mounting substrate is facilitated.

An electronic component of a third aspect of the present disclosure includes an element body containing magnetic particles and resin; a coil incorporated in the element body and formed by winding a conductive wire; a marker area disposed on a surface of the element body and containing non-conductive particles; and a pair of outer electrodes disposed on the surface of the element body and connected to the coil. The non-conductive particles have a smaller volume average particle diameter than the magnetic particles, and the non-conductive particles are disposed between the magnetic particles in the marker area.

Because the marker area contains non-conductive particles, the marker area has good identifiability with respect to the areas other than the marker area. In addition, due to the non-conductive particles, it is possible to increase the degrees of freedom in size and arrangement of the outer electrodes and the marker area formed on the surface of the electronic component. Further, since the non-conductive particles have a smaller volume average particle diameter than the magnetic particles, the non-conductive particles enter into gaps formed by the plurality of magnetic particles to be disposed therein, whereby good identifiability is obtained without adding the thickness of the marker area to the element body.

The ratio of the volume average particle diameter of the magnetic particles to the non-conductive particles may be equal to or more than 30. In a case where the volume average particle diameters differ by an amount equal to or more than a predetermined ratio, a larger number of non-conductive particles can be disposed, and an electronic component having more excellent identifiability is constituted.

The magnetic particles used in the electronic component and the manufacturing method therefor may be metal magnetic particles. The metal magnetic material has high saturation magnetic flux density, which makes it easy for the electronic component to reduce the size, reduce the loss, and handle a large current.

Hereinafter, an embodiment of the present disclosure will be described based on the drawings. Note that the following embodiments exemplify an electronic component and a manufacturing method therefor in order to embody the technical idea of the present disclosure, and the present disclosure is not limited to an electronic component and a manufacturing method for the stated electronic component described below. It should be noted that the members described in the appended claims are not limited to the members of the embodiment in any way. In particular, dimensions, materials, shapes, relative arrangement, and the like of the constituent components described in the embodiment are not intended to limit the scope of the present disclosure only to the scope of the embodiment unless otherwise specified, and are merely illustrative.

In the drawings, the same reference numerals denote the same constituent elements. In order to facilitate the explanation or understanding of the essential points, the embodiment is separated and described for the sake of convenience; however, configurations illustrated in different embodiments can be partially replaced or combined with each other. In Working Example 2 and its subsequent Working Examples, the same constituent elements as those in Working Example 1 will not be described, and only different points therefrom will be described. In particular, the same action effects by the same configurations will not be described in each embodiment. In the present specification, the term "process" is intended to encompass not only an independent process but also a process whose purpose is achieved as expected even if it is not clearly distinguishable from other processes. Further, the content of each of components in a composition refers to, in a case where a plurality of materials corresponding to each of the components is present in the composition, a total amount of the plurality of materials present in the stated composition unless otherwise specified. Moreover, the volume average particle diameter of the magnetic particles and the volume average particle diameter of the non-conductive particles are each determined, by measuring the particle size distribution through the laser diffraction/scattering method, as a particle diameter corresponding to a cumulative volume of 50% from a small diameter side.

Working Example 1

Figure 1B:
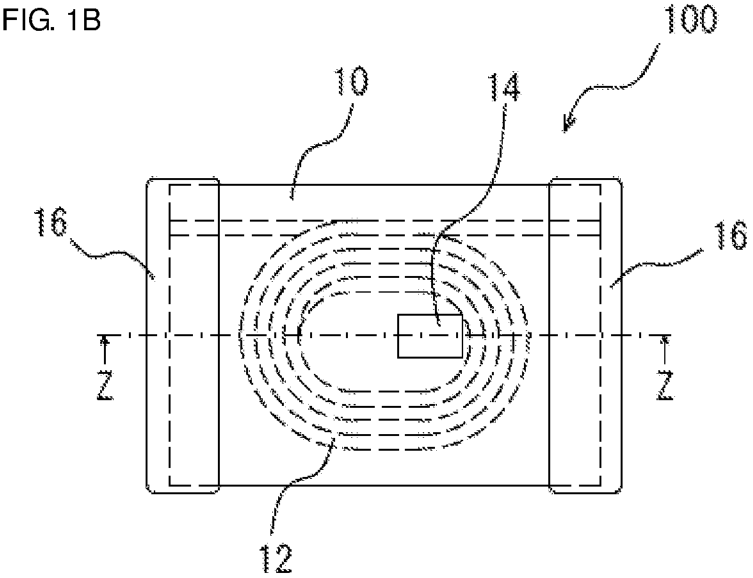
FIG. 1B is a transparent plan view of an electronic component.
Figure 1C:
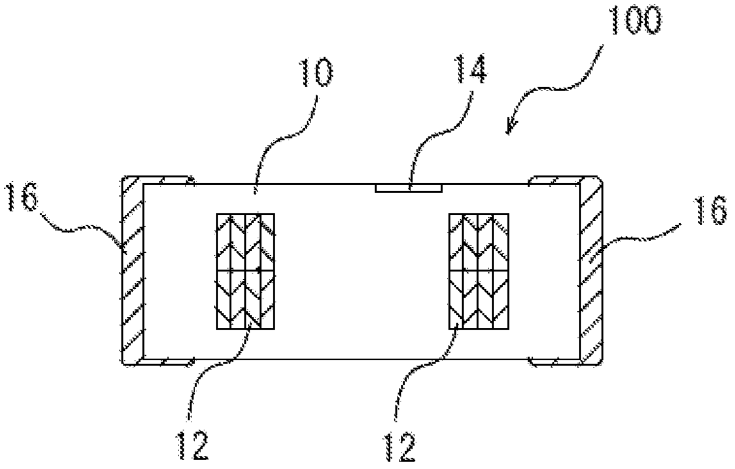
FIG. 1C is a cross-sectional view of an electronic component taken along a Z-Z plane in FIG. 1B.
Figure 1D:
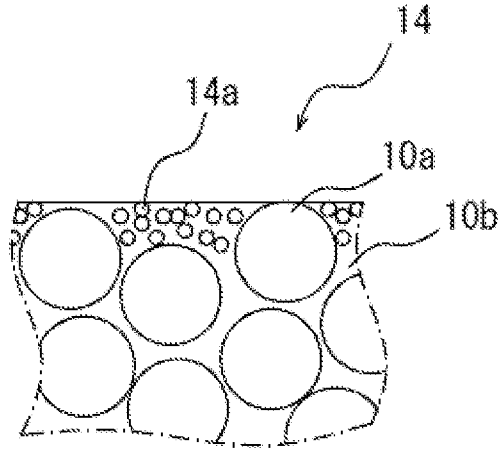
FIG. 1D is a partially enlarged cross-sectional view of a marker area of an electronic component.

FIG. 1A is a plan view illustrating an example of an external appearance of an electronic component 100 according to Working Example 1. FIG. 1B is a transparent plan view of the electronic component 100. FIG. 1C is a schematic cross-sectional view taken along a Z-Z plane in FIG. 1B. FIG. 1D is a schematic cross-sectional view in which part of a marker area 14 in FIG. 1C is enlarged and illustrated. The electronic component 100 is, for example, an inductor including a coil and a magnetic body incorporating the coil.

FIG. 1A is a plan view of the electronic component 100 viewed from the side of a surface where the marker area 14 is disposed. The electronic component 100 includes an element body 10, the marker area 14 disposed on the surface of the element body 10, and a pair of outer electrodes 16. The element body 10 of the electronic component 100 is a pressurized compact of a composition containing magnetic particles and resin. The element body 10 is formed containing magnetic particles and a thermosetting resin. As the magnetic particles, metal magnetic particles such as iron-based materials, ferrite, and the like are used, for example. As the thermosetting resin, an epoxy resin or the like is used. The element body 10 incorporates the coil. A pair of lead ends of the coil is exposed to end surfaces in a longitudinal direction of the element body 10 and respectively connected to the outer electrodes 16. The marker area 14 contains non-conductive particles, and is visually identified as an area different from other areas of the element body 10. The marker area 14 may be formed in a partial region of one surface of the electronic component 100, or may be formed on the entirety of one surface thereof. The marker area 14 is formed by non-conductive particles being buried in the element body 10, and constitutes one surface along with the element body 10. In FIG. 1A, the marker area 14 is formed in a substantially rectangular shape, but the shape thereof is not particularly limited as long as the shape can be identified as an area different from the area other than the marker area. The shape of the marker area 14 may be a substantially linear shape, a substantially polygonal shape, a substantially circular shape, a substantially elliptical shape, a substantially oval shape or the like, and may be a substantially semicircular shape, a substantial quadrant shape or the like in which part of the above-mentioned shape is removed. In FIG. 1A, each of the outer electrodes 16 is so formed as to extend on the end surface in the longitudinal direction of the element body 10 and also extend across four surfaces orthogonal to the above end surface. The outer electrode 16 may be formed on the end surface in the longitudinal direction of the element body 10 and on at least one surface of the surfaces orthogonal to the end surface. For example, the outer electrode 16 may be provided on the end surface in the longitudinal direction of the element body 10 and on the surface opposing the surface of the element body 10 where the marker area is disposed. In FIG. 1A, although the marker area 14 and the outer electrode 16 are formed being spaced from each other, the outer electrode 16 may be formed while covering part of the marker area 14.

FIG. 1B is a transparent plan view of the electronic component 100 viewed from the same direction as in FIG. 1A. The element body 10 incorporates a coil 12 formed by winding a conductive wire. A pair of lead ends of the coil 12 is exposed to each of the end surfaces in the longitudinal direction of the element body 10. For example, the coil 12 is formed by winding a rectangular wire having a substantially rectangular cross section and having an insulating coating thereon. The cross-sectional shape of the conductive wire constituting the coil 12 is not limited to a rectangular shape, and may be a circular shape or a polygonal shape. In addition, a winding method of the coil 12 may be any of an a winding, an edgewise winding, and the like. In FIG. 1B, the pair of lead ends of the coil 12 is connected with the outer electrodes 16 by exposing end surfaces of the conductive wire to the surface of the element body 10, but may be connected with the outer electrodes 16 by exposing side surfaces of the conductive wire to the surface of the element body 10. In the electronic component 100, the marker area 14 is disposed on a surface orthogonal to the winding axis direction of the coil 12.

FIG. 1C is a schematic cross-sectional view obtained by cutting the electronic component 100 along the Z-Z plane in FIG. 1B, in a direction parallel to the winding axis direction of the coil 12. In FIG. 1C, the coil 12 formed by winding a conductive wire in two tiers is incorporated in the element body 10. The marker area 14 is formed by non-conductive particles being buried in a surface region of the element body 10. The surface of the marker area 14 forms one surface along with the surface of the element body 10. In another mode, the surface of the marker area may be disposed closer to the element body side relative to the surface of the element body. In other words, the marker area may be formed as a recessed section on the surface of the element body.

FIG. 1D is a schematic cross-sectional view in which a portion near the surface of the marker area 14 is enlarged and illustrated. The marker area 14 is configured to contain a magnetic particle 10*a*, resin 10*b*, and a non-conductive particle 14*a*. In the marker area 14, the non-conductive particles 14*a* having a smaller volume average particle diameter are buried in gaps formed between the magnetic particles 10*a* having a larger volume average particle diameter. Since the volume average particle diameter of the non-conductive particles is small, a sufficient amount of the non-conductive particles 14*a* for the identification can be disposed without reducing the content of the magnetic particles 10*a*. The ratio of the volume average particle diameter of the magnetic particles 10*a* to the non-conductive particles 14*a* is, for example, equal to or more than 10, and preferably equal to or more than 30. The magnetic particles 10*a* may be metal magnetic particles such as iron-based materials, ferrite, or the like. The volume average particle diameter of the magnetic particles 10*a* is, for example, equal to or larger than 1 μm and equal to or smaller than 100 μm (i.e., from 1 μm to 100 μm). The non-conductive particles 14*a* are, for example, metallic oxide particles such as alumina or zinc oxide materials, and the volume average particle diameter thereof is, for example, less than 1 μm. Further, the non-conductive particles 14*a* may have a color tone different from that of the magnetic particles 10*a*, or may be arbitrarily colored particles.

Working Example 2

Figure 2A:
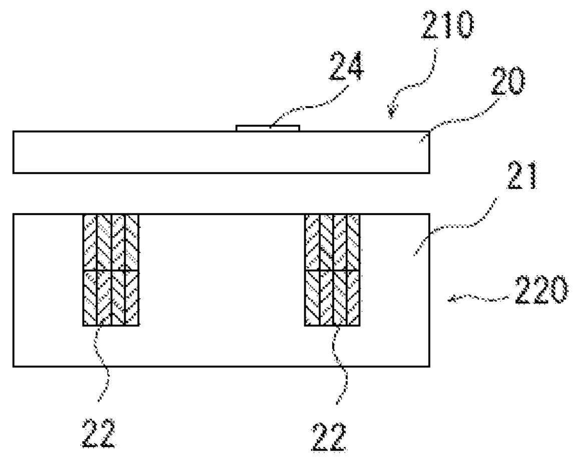
FIGS. 2A to 2D are cross-sectional views illustrating an outline of a manufacturing process of an electronic component.

FIGS. 2A to 2D are schematic process diagrams explaining a manufacturing method for an electronic component 200 of the present embodiment, and cross-sectional views for each processing of the manufacturing method are illustrated in FIGS. 2A to 2D. In FIG. 2A, prepared is a first composite magnetic section 210 including a first composite magnetic layer 20 containing magnetic particles and resin, and a marker layer 24 disposed on the first composite magnetic layer 20 and containing non-conductive particles. It is sufficient for the marker layer 24 to contain non-conductive particles, and the marker layer 24 may contain resin in addition to the non-conductive particles. In the case where the marker layer 24 contains resin, the resin may be the same kind of resin as the resin constituting the first composite magnetic layer, or may be a different kind of resin therefrom. The marker layer 24 is formed, for example, by applying a paste containing non-conductive particles and resin onto a surface of the first composite magnetic layer 20 by printing or the like. In addition, in FIG. 2A, prepared is a second composite magnetic section 220 including a second composite magnetic layer 21 containing magnetic particles and resin, and a coil 22 formed by winding a conductive wire. In the second composite magnetic section 220, the coil 22 is partially buried in the second composite magnetic layer 21, and an upper surface portion of the coil 22 is exposed on the second composite magnetic layer 21. Although only the upper surface of the coil 22 is exposed from the second composite magnetic layer 21 in FIG. 2A, the upper surface and part of the side surface of the coil 22 may be exposed. The second composite magnetic section 220 can be prepared by inserting the coil 22 into the second composite magnetic layer 21 along the winding axis direction of the coil.

Figure 2B:
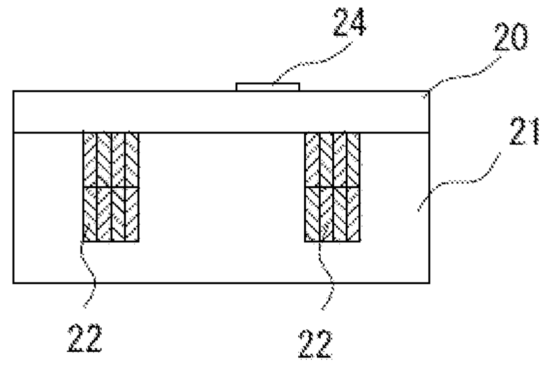

In FIG. 2B, a multilayer body in which the first composite magnetic section and the second composite magnetic portion are laminated is obtained. In the multilayer body, the second composite magnetic section in which the coil 22 is buried, the first composite magnetic layer 20, and the marker layer 24 are laminated in this order. The multilayer body is formed by laminating the first composite magnetic section and the second composite magnetic section in a manner in which the surface on the opposite side of the first composite magnetic section to the surface where the marker layer is disposed opposes the surface of the second composite magnetic section where the coil 22 is exposed.

Figure 2C:
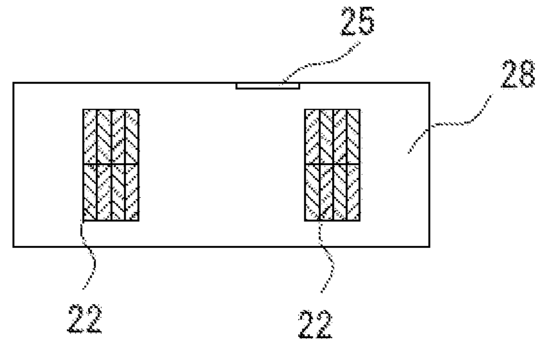

In FIG. 2C, the multilayer body obtained in FIG. 2B is compression-molded along the winding axis direction of the coil 22 to obtain a compact. The compact includes an element body 28 incorporating the coil 22 and a marker area 25 integrally formed with the element body 28 on the surface of the element body 28. The element body 28 is formed by the first composite magnetic layer and the second composite magnetic layer being integrated, and contains magnetic particles and resin. By performing compression molding on the multilayer body of FIG. 2B, the non-conductive particles contained in the marker layer 24 are pressed into the first composite magnetic layer to form the marker area 25. At the same time, the first composite magnetic layer is integrated with the second composite magnetic body layer to form the element body 28. Compression molding of the multilayer body may be performed in a manner in which the multilayer body is set in a mold and pressurized in the winding axis direction of the coil 22. In addition, during the compression molding of the multilayer body, heat may be applied along with the pressure. In the case of heating, for example, it is sufficient for the heating temperature to be a temperature at which the resin cures; that is, the temperature may be equal to or lower than 200° C., and preferably equal to or lower than 150° C., for example. Since the marker layer 24 is disposed on a predetermined surface, and then the non-conductive particles contained in the marker layer 24 are pressed into the element body to form the marker area 25, it is possible to efficiently manufacture an electronic component in which the winding axis direction of the incorporated coil can be easily identified. In addition, in a case where the marker area 25 is formed as a recessed section on the surface of the element body, the manufacturing method may further include processing of removing part of the surface of the marker area 25.

Figure 2D:
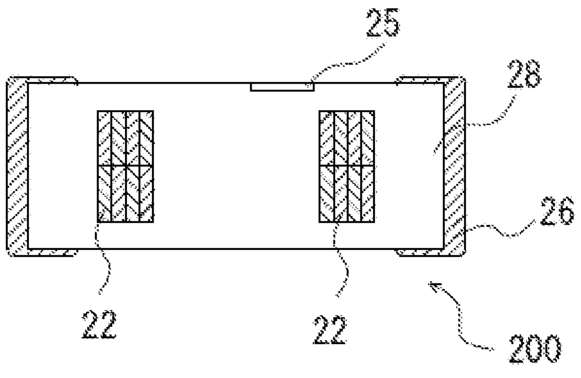

In FIG. 2D, a pair of outer electrodes 26 respectively connected to a pair of lead ends (not illustrated) of the coil 22 is formed on the surface of the element body 28 incorporating the coil 22. Each of the outer electrodes 26 is formed with a conductive paste containing a metal such as silver, copper, or the like. The pair of lead ends of the coil 22 may be exposed from the second composite magnetic layer 21 when forming the second composite magnetic section, or may be exposed from the element body 28 by cutting part of the element body 28 after the compression molding of the multilayer body.

Working Example 3

Figure 3A:
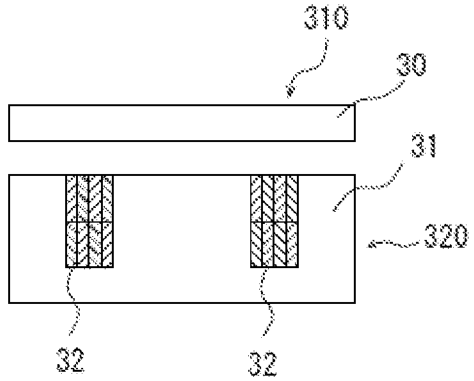
FIGS. 3A to 3E are cross-sectional views illustrating another example of a manufacturing process of an electronic component.

FIGS. 3A to 3E are schematic process diagrams explaining another example of a manufacturing method for an electronic component 300 of the present embodiment, and cross-sectional views for each processing of the manufacturing method are illustrated in FIGS. 3A to 3E. The manufacturing method of Working Example 3 is different from the manufacturing method of Working Example 2 in that a marker layer 34 is disposed on a second composite magnetic section. In FIG. 3A, prepared is a first composite magnetic section 310 including a first composite magnetic layer 30 containing magnetic particles and resin. In addition, in FIG. 3A, prepared is a second composite magnetic section 320 including a second composite magnetic layer 31 containing magnetic particles and resin, and a coil 32 formed by winding a conductive wire. In the second composite magnetic section 320, the coil 32 is buried in the second composite magnetic layer 31 while exposing the upper surface thereof from the second composite magnetic layer 31.

Figure 3B:
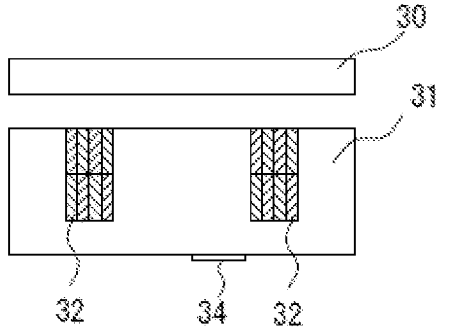

In FIG. 3B, the marker layer 34 containing non-conductive particles is disposed on a surface on the opposite side of the second composite magnetic layer 31 to the surface where the coil 32 is exposed. For example, the marker layer 34 is formed by applying a paste containing non-conductive particles and resin to the second composite magnetic layer 31 by printing or the like.

Figure 3C:
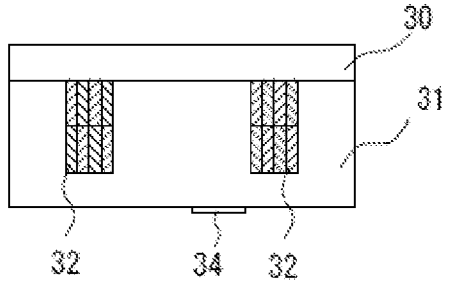

In FIG. 3C, a multilayer body in which the first composite magnetic section and the second composite magnetic section are laminated is obtained. In the multilayer body, the first composite magnetic section is laminated on the second composite magnetic section in which the coil 32 is buried, and the marker layer 34 is laminated on the second composite magnetic layer 31. The multilayer body is formed by laminating the first composite magnetic section and the second composite magnetic section in a manner in which the first composite magnetic section opposes the surface of the second composite magnetic section where the coil 32 is exposed.

Figure 3D:
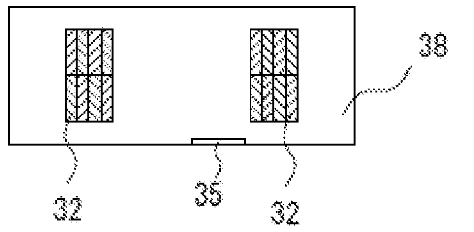

In FIG. 3D, the multilayer body obtained in FIG. 3C is compression-molded along the winding axis direction of the coil 32 to obtain a molded body. The molded body includes an element body 38 incorporating the coil 32 and a marker area 35 integrally formed with the element body 38 on the surface of the element body 38. The element body 38 is formed by the first composite magnetic layer and the second composite magnetic layer being integrated, and contains magnetic particles and resin. By performing compression molding on the multilayer of FIG. 3C, the non-conductive particles contained in the marker layer 34 are pressed into the second composite magnetic layer to form the marker area 35. At the same time, the second composite magnetic layer is integrated with the first composite magnetic layer to form the element body 38.

Figure 3E:
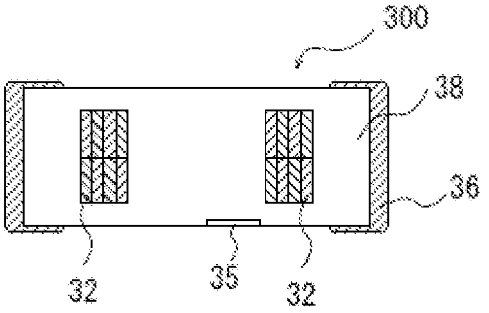

In FIG. 3E, a pair of outer electrodes 36 respectively connected to a pair of lead ends of the coil 32 is formed on the surface of the element body 38 incorporating the coil 32. Each of the outer electrodes 36 is formed with a conductive paste containing a metal such as silver or copper. The pair of lead ends of the coil 32 may be exposed from the second composite magnetic layer 31 when forming the second composite magnetic section, or may be exposed from the element body 38 by cutting part of the element body 38 after the compression molding of the multilayer body.

Working Example 4

Figure 4A:
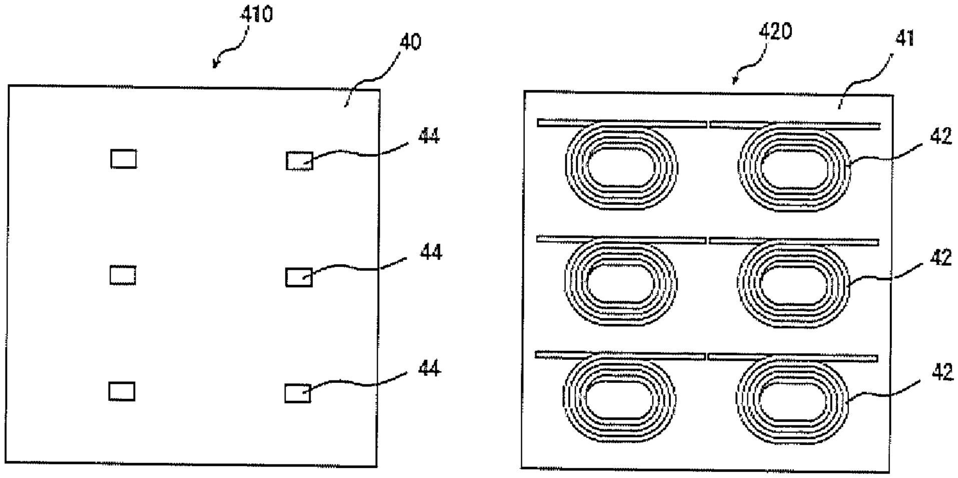
FIGS. 4A to 4C are cross-sectional views illustrating still another example of a manufacturing process of an electronic component.
Figure 4B:
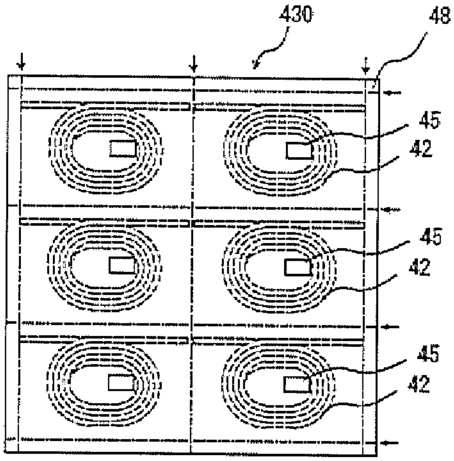
Figure 4C:
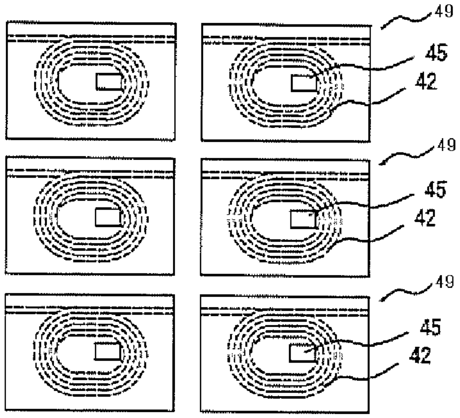

FIGS. 4A to 4C are schematic process diagrams explaining still another example of a manufacturing method for an electronic component of the present embodiment, and plan views or transparent plan views for each processing of the manufacturing method are illustrated in FIGS. 4A to 4C. The manufacturing method of Working Example 4 is different from the manufacturing method of Working Example 2 in that a second composite magnetic section includes a plurality of coils. FIG. 4A illustrates plan views of a first composite magnetic section 410 and a second composite magnetic section 420. The first composite magnetic section 410 includes a first composite magnetic layer 40 containing magnetic particles and resin, and at least one marker layer 44 disposed on the first composite magnetic layer 40 and containing non-conductive particles. For example, the marker layer 44 is formed by applying a paste containing non-conductive particles and resin onto one surface of the first composite magnetic layer 40 by printing or the like. In FIG. 4A, a plurality of marker layers 44 is provided, and each marker layer is so disposed as to correspond to a coil 42 in the second composite magnetic section 420. Further, the marker layer 44 may be so disposed as to cover the entirety of one surface of the first composite magnetic layer 40. The second composite magnetic section 420 includes a second composite magnetic layer 41 containing magnetic particles and resin, and the coil 42 formed by winding a conductive wire. In the second composite magnetic section 420, the coil 42 is partially buried in the second composite magnetic layer 41, and an upper surface of the coil 42 is exposed on the second composite magnetic layer 41. The second composite magnetic section 420 is prepared in the following manner a plurality of coils 42 is disposed on one surface of the second composite magnetic layer 41 while adjusting winding axis directions of the coils and further adjusting lead portions from the coils, and then the coils 42 are inserted into the second composite magnetic layer 41 along the winding axis directions of the coils 42.

FIG. 4B is a transparent plan view of a compact 430 obtained by performing compression molding on a multilayer body of the first composite magnetic section and the second composite magnetic section. The first composite magnetic section and the second composite magnetic section are laminated in the same manner as in Working Example 2, thereby forming the multilayer body. The molded body is obtained by performing compression molding on the multilayer body along the winding axis direction of the coil 42. The molded body includes an element body 48 incorporating the plurality of coils 42, and a plurality of marker areas 45 integrally formed with the element body 48 on the surface of the element body 48. The plurality of marker areas 45 is respectively arranged corresponding to the coils 42.

FIG. 4C illustrates transparent plan views of a plurality of divided bodies 49 obtained by dividing a molded body incorporating the plurality of coils 42. The divided body 49 includes an element body containing magnetic particles and resin, the coil 42 incorporated in the element body, and the marker area 45 disposed on the element body. The divided body 49 is formed by cutting the compact in arrow directions in FIG. 4B, for example. In the divided body 49, a pair of lead ends of the coil 42 is exposed on a surface of the element body. An electronic component is manufactured by forming outer electrodes to be respectively connected to the pair of lead ends of the coil 42 on the surface of the divided body 49. By disposing the marker layer 44 on a predetermined surface in advance and forming the marker area 45 based on the marker layer 44, it is possible to efficiently manufacture an electronic component in which the winding axis direction of the incorporated coil can be identified.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An electronic component comprising:

an element body containing magnetic particles and resin;

a coil incorporated in the element body and formed by winding a conductive wire;

a marker area disposed on a surface of the element body and containing non-conductive particles; and a pair of outer electrodes disposed on the surface of the element body and connected to the coil, wherein the non-conductive particles have a smaller volume average particle diameter than that of the magnetic particles, and the non-conductive particles are disposed between the magnetic particles in the marker area.

2. The electronic component according to claim 1, wherein a ratio of the volume average particle diameter of the magnetic particles to the volume average particle diameter of the non-conductive particles is equal to or greater than 30.

3. The electronic component according to claim 1, wherein the magnetic particles are metal magnetic particles.

4. The electronic component according to claim 1, wherein at least one of the outer electrodes is spaced from the marker area.

5. The electronic component according to claim 1, wherein at least one of the outer electrodes covers a portion of a surface of the molded body including the marker area.

6. The electronic component according to claim 1, wherein the non-conductive particles are metallic oxide particles.

* * * * *